United States Patent
Choi

(10) Patent No.: US 7,405,795 B2
(45) Date of Patent: Jul. 29, 2008

(54) IN-PLANE-SWITCHING MODE LIQUID CRYSTAL DISPLAY DEVICE AND METHOD OF FABRICATING THE SAME WITH NEMATIC LIQUID CRYSTAL MOLECULE LAYER DRIVEN IN-PLANE BY MOLECULES OF SANDWICHING FERROELECTRIC LAYERS ROTATING ALONG A VIRTUAL CONE

(75) Inventor: Su Seok Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 474 days.

(21) Appl. No.: 11/022,768

(22) Filed: Dec. 28, 2004

(65) Prior Publication Data
US 2005/0140904 A1 Jun. 30, 2005

(30) Foreign Application Priority Data
Dec. 29, 2003 (KR) ...................... 10-2003-0099336

(51) Int. Cl.
*G02F 1/1343* (2006.01)
(52) U.S. Cl. .................. 349/141; 349/172; 428/1.1
(58) Field of Classification Search .................. 349/141, 349/172
See application file for complete search history.

(56) References Cited

U.S. PATENT DOCUMENTS

| | | | |
|---|---|---|---|
| 4,490,015 A | 12/1984 | Kawarada et al. | |
| 4,983,318 A | 1/1991 | Matsumoto et al. | |
| 5,039,208 A | 8/1991 | Ohnishi et al. | |
| 5,119,221 A | 6/1992 | Nakajima et al. | |
| 5,258,134 A | 11/1993 | Yoshinaga et al. | |
| 5,745,629 A | 4/1998 | Sasaki | |
| 5,925,423 A | 7/1999 | Han et al. | |
| 6,048,928 A | 4/2000 | Yu et al. | |
| 6,344,889 B1* | 2/2002 | Hasegawa et al. | 349/129 |
| 6,373,549 B1* | 4/2002 | Tombling et al. | 349/201 |
| 6,417,907 B2 | 7/2002 | Choi et al. | |
| 6,570,637 B2 | 5/2003 | Choi et al. | |
| 2005/0179855 A1* | 8/2005 | Helgee et al. | 349/172 |

OTHER PUBLICATIONS

L. Komitov et al., "Fast Switching B Electrically Commanded Surfaces (ECS)", *7th International Conference on Ferroelectric Liquid Crystal, Conference Summaries*, pp. 26-27 (1999).

* cited by examiner

*Primary Examiner*—David C. Nelms
*Assistant Examiner*—John Heyman
(74) *Attorney, Agent, or Firm*—McKenna, Long & Aldridge LLP

(57) ABSTRACT

An in-plane-switching mode liquid crystal display device includes a first ferroelectric liquid crystal layer on a first substrate, a second ferroelectric liquid crystal layer on a second substrate, the first and second substrates being bonded to each other with a space therebetween, and a nematic liquid crystal layer at the space between the first and second ferroelectric liquid crystal layers, the first and second ferroelectric liquid crystal layers including a photo-polymerizational monomer.

21 Claims, 6 Drawing Sheets

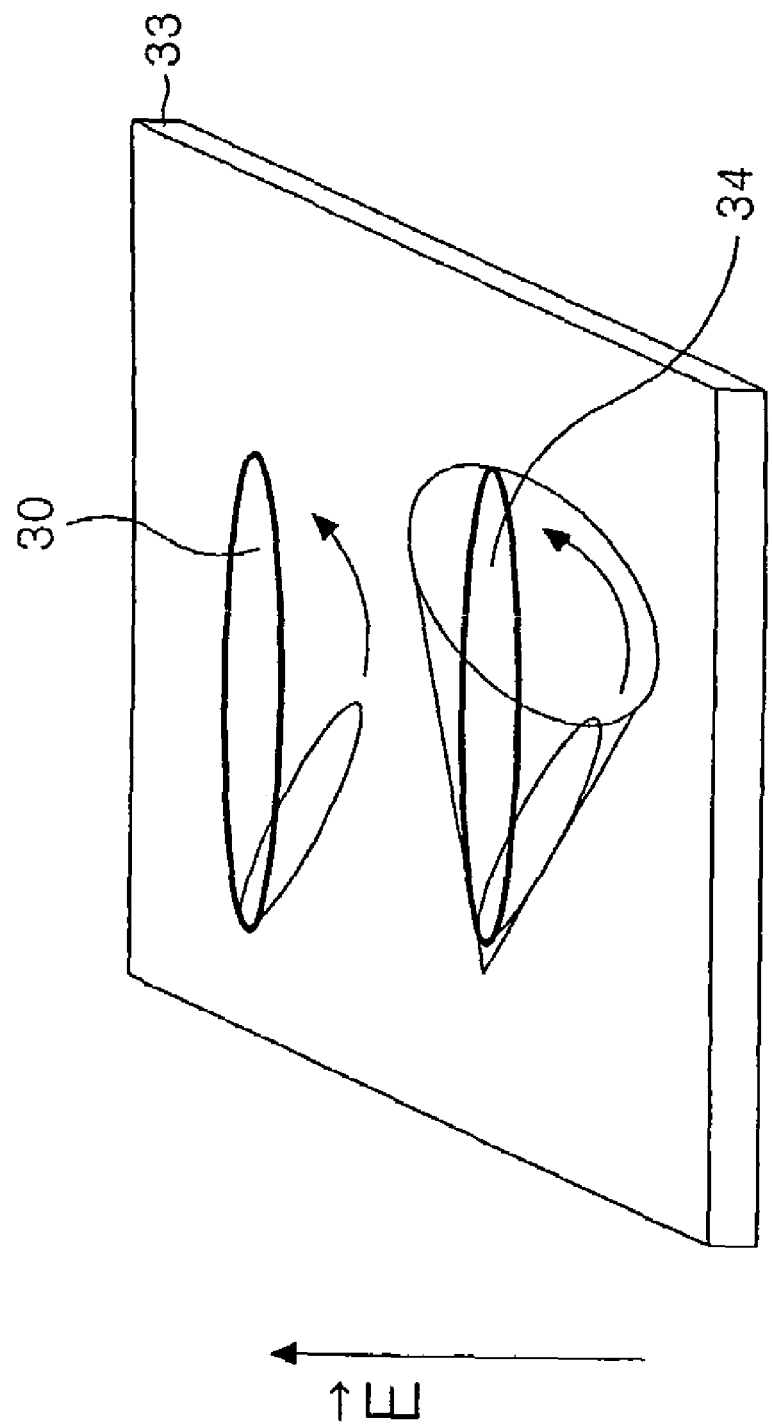

IN-PLANE-SWITCHING MODE LIQUID CRYSTAL DISPLAY DEVICE AND METHOD OF FABRICATING THE SAME WITH NEMATIC LIQUID CRYSTAL MOLECULE LAYER DRIVEN IN-PLANE BY MOLECULES OF SANDWICHING FERROELECTRIC LAYERS ROTATING ALONG A VIRTUAL CONE

The present application claims the benefit of Korean Patent Application No. P2003-99336 filed in Korea on Dec. 29, 2003, which is hereby incorporated by reference.

BACKGROUND OF THE INVENTION

1. Field of the Invention

The present invention relates to a display device, and, more particularly, to an in-plane-switching mode liquid crystal display device using a ferroelectric liquid crystal material and a method of fabricating the same.

2. Discussion of the Related Art

In general, a liquid crystal display (LCD) device controls an electric field applied to a liquid crystal cell. The controlling of the electric field modulates light incident to the liquid crystal cell, thereby displaying a picture. The liquid crystal display devices may employ a vertical electric field method and a horizontal electric field method to drive the liquid crystal cell.

In the vertical electric field method, a pixel electrode and a common electrode are formed on an upper substrate and a lower substrate, respectively. Thus, the pixel and common electrodes are vertically opposite to each other, and an electric field is generated vertically across a liquid crystal cell by a voltage difference applied between the pixel and common electrodes. For example, a twisted nematic (TN) mode LCD device generally uses the vertical electric field method. The twisted nematic mode LCD device has a relatively wide aperture ratio. However, since the liquid crystal molecules have different refractive indices, a display picture varies for an observer depending on a viewing angle. Thus, there is a disadvantage that the realization of wide viewing angle is difficult.

Further, in-plane-switching (IPS) mode LCD devices generally use the horizontal electric field method. In the horizontal electric field method, an electric field is generated between the electrodes formed on the same substrate to drive the liquid crystal cell.

FIG. 1 is a schematic cross-sectional view of an in-plane-switching mode liquid crystal display device according to the related art. In FIG. 1, a liquid crystal display device includes an upper glass substrate 12 and a lower glass substrate 18 with a liquid crystal layer having liquid crystal molecules 14 formed therebetween. A polarizer 11 and an alignment layer 13 are respectively formed on an upper surface and a lower surface of the upper substrate 12. In addition, an alignment film 17 and a polarizer 19 are respectively formed on an upper surface and a lower surface of the lower substrate 18. In particular, the axes of the polarizers 11 and 19 cross each other.

Further, a common electrode 15 and a pixel electrode 16 are formed on the alignment film 17 on the lower substrate 18. In particular, an electric field 20 is generated along a horizontal direction by a voltage difference applied between the common electrode 15 and the pixel electrode 16. As a result, the liquid crystal molecules 14 are rotated by the electric field 20, thereby modulating a polarization component of light transmitting through the liquid crystal layer. For instance, if the polarization component of light transmitting through the liquid crystal layer is changed by 90 degrees, then light passes through the upper polarizer 11. On the other hand, if the polarization component of light does not change, then light cannot pass thorough the upper polarizer 11.

The IPS mode liquid crystal display device according to the related art has a wide viewing angle since a refractive index change of the liquid crystal molecules 14 is not large. However, the electric field applied to the liquid crystal molecules 14 is done with the opaque common and pixel electrodes 15 and 16 on the lower substrate 18. In particular, because a light switching is not made on the common and pixel electrodes 15 and 16, the electric field applied to the liquid crystal molecules 14 is bent. Thus, the IPS mode liquid crystal display device according to the related art has a disadvantage of having a low aperture ratio.

SUMMARY OF THE INVENTION

Accordingly, the present invention is directed to an in-plane-switching mode liquid crystal display device and a method of fabricating the same that substantially obviate one or more of the problems due to limitations and disadvantages of the related art.

An object of the present invention is to provide a liquid crystal display device of in-plane-switching mode, where it is possible to realize a wide viewing angle without a deterioration of the aperture ratio, and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an in-plane-switching mode liquid crystal display device includes a first ferroelectric liquid crystal layer on a first substrate, a second ferroelectric liquid crystal layer on a second substrate, the first and second substrates being bonded to each other with a space therebetween, and a nematic liquid crystal layer at the space between the first and second ferroelectric liquid crystal layers, the first and second ferroelectric liquid crystal layers including a photo-polymerizational monomer.

In another aspect, a method of fabricating an in-plane-switching mode liquid crystal display device includes forming a first ferroelectric liquid crystal layer on a first substrate, forming a second ferroelectric liquid crystal layer on a second substrate, the first and second ferroelectric liquid crystal layers including a photo-polymerizational monomer, attaching the first and second substrates to each other with a space therebetween, and forming a nematic liquid crystal layer at the space between the first and second ferroelectric liquid crystal layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3 is a schematic perspective view illustrating the movement of a ferroelectric liquid crystal and a nematic liquid crystal in the liquid crystal display according to an embodiment of the present invention.

DETAILED DESCRIPTION OF THE PREFERRED EMBODIMENTS

Figure 1:
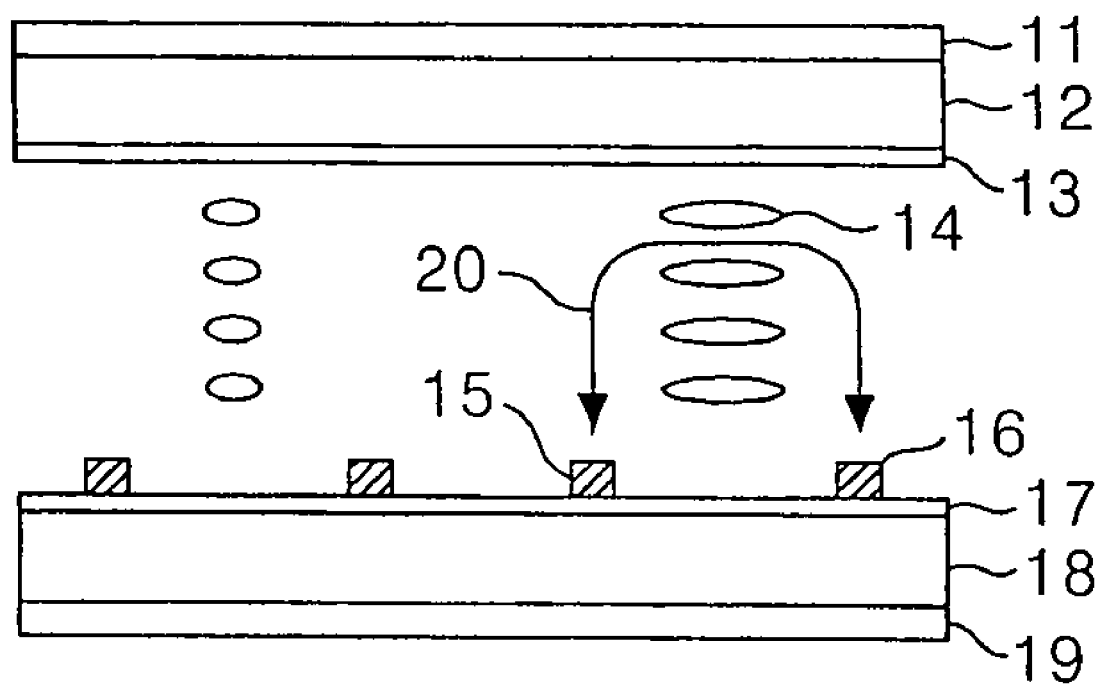
FIG. 1 is a schematic cross-sectional view of an in-plane switching mode liquid crystal display device according to the related art.
Figure 2A:
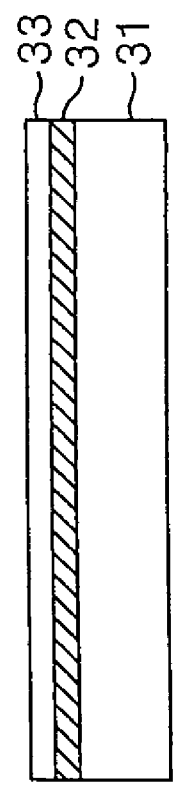
FIGS. 2A to 2D are schematic cross-sectional views illustrating a method of fabricating a liquid crystal display according to an embodiment of the present invention.
Figure 2A:
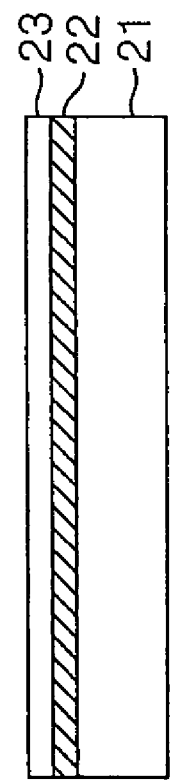

Reference will now be made in detail to the preferred embodiments, examples of which are illustrated in the accompanying drawings. FIGS. 2A to 2D are schematic cross-sectional views illustrating a method of fabricating a liquid crystal display according to an embodiment of the present invention. In FIG. 2A, an upper electrode 22 and an upper alignment film 23 are formed on an upper substrate 21. In addition, a lower electrode 32 and a lower alignment film 33 are formed on a lower substrate 31. The upper and lower substrates 21 and 31 may be formed of a transparent glass material. The upper and lower electrodes 22 and 32 may be formed of a transparent conductive material, such as indium-tin-oxide (ITO).

Further, the upper and lower alignment films 23 and 33 may be formed of an organic material, such as polyimide. The upper and lower alignment films 23 and 33 also may be rubbed to set a pre-tilt angle of ferroelectric liquid crystal molecules 24 and 34 (shown in FIG. 2B) that are subsequently formed therebetween. The polarizer (not shown) crossing a light transmission axis is formed onto the light incident plane of the lower substrate 31 and the light out-coming plane of the upper substrate 21.

Figure 2B:
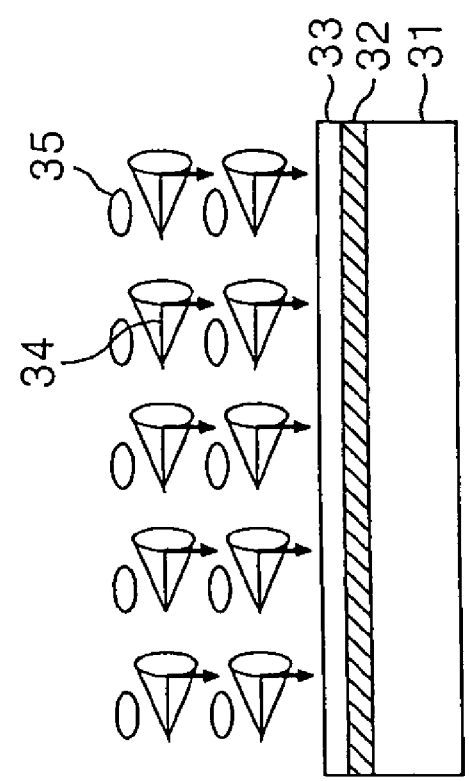
Figure 2B:
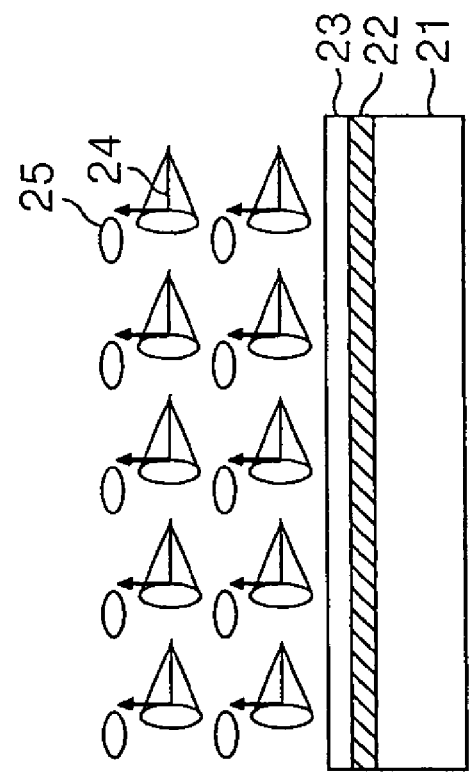

As shown in FIG. 2B, a slight amount of photo-polymerizational monomers 25 and 35 are added into ferroelectric liquid crystal molecules 24 and 34 during a chiral smectic C* phase of forming the ferroelectric liquid crystal molecules 24 and 34. For instance, the ferroelectric liquid crystal molecules 24 and 34 and the photo-polymerizational monomers 25 and 35 may have a composition ratio as shown in Table 1 below.

TABLE 1

| Ferroelectric liquid crystal | 95 wt %~99 wt % |
|---|---|
| Photo-polymerizational monomer | 1 wt %~5 wt % |

In addition, the ferroelectric liquid crystal molecules 24 and 34 may include any known ferroelectric liquid crystal material, and the photo-polymerizational monomers 25 and 35 may include any known nematic photo-polymerizational monomer. In particular, the photo-polymerizational monomers 25 and 35 may be uniformly mixed with the ferroelectric liquid crystal molecules 24 and 34, respectively, and then the mixture may be evenly spread on the alignment films 23 and 33, respectively. The ferroelectric liquid crystal molecules 24 and 34 may be formed in a nematic system.

Further, the mixture of the ferroelectric liquid crystal molecules 24 and 34 and the photo-polymerizational monomers 25 and 35 may be exposed to a medium of which the electrical negativity is high. Alternatively, an electric field or a magnetic field may be applied to the mixture of the ferroelectric liquid crystal molecules 24 and 34 and the photo-polymerizational monomers 25 and 35. Thus, the ferroelectric liquid crystal molecules 24 and 34 may be aligned along the spontaneous polarization direction, shown as the arrows in FIG. 2B. For instance, the mixture may be exposed to an atmosphere of water ($H_2O$) or oxygen ($O_2$) as a medium with a high polarity.

When exposing to the medium with a high polarity, the ferroelectric liquid crystal molecules 24 and 34 change from an isotropic phase to a smectic A phase, a chiral smectic C* phase and a chiral nematic N* phase due to the transition temperature. In addition, the spontaneous polarization of the ferroelectric liquid crystal molecules 24 and 34 faces toward the medium. On the contrary, when exposing to a medium with a low polarity, such as nitrogen ($N_2$) or air, the spontaneous polarization of the ferroelectric liquid crystal molecules 24 and 34 faces toward the opposite of the medium. Thus, a temperature treatment is carried out to make phase transition from the smectic A phase or the chiral nematic N* phase to the chiral smectic C* phase.

Further, when applying an electric field or a magnetic field to the ferroelectric liquid crystal molecules 24 and 34 under the transition temperature, the ferroelectric liquid crystal molecules 24 and 34 change from the isotropic phase to the smectic A phase, the chiral smectic C* phase and the chiral nematic N* phase. The spontaneous polarization of the ferroelectric liquid crystal molecules 24 and 34 is aligned in parallel to the electric field or the magnetic field.

As a result, by exposing the mixture to the medium with an electrical polarity or by applying an electric field or a magnetic field to the mixture, the ferroelectric liquid crystal molecules 24 formed on the upper substrate 21 may have the spontaneous polarization direction facing the opposite direction of the upper substrate 21 and the ferroelectric liquid crystal molecules 34 formed on the lower substrate 31 may have the spontaneous polarization direction facing toward the lower substrate 31.

Figure 2C:
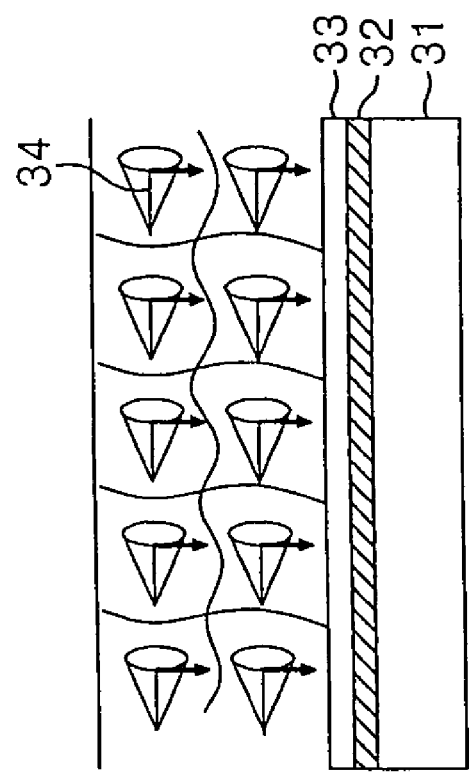
Figure 2C:
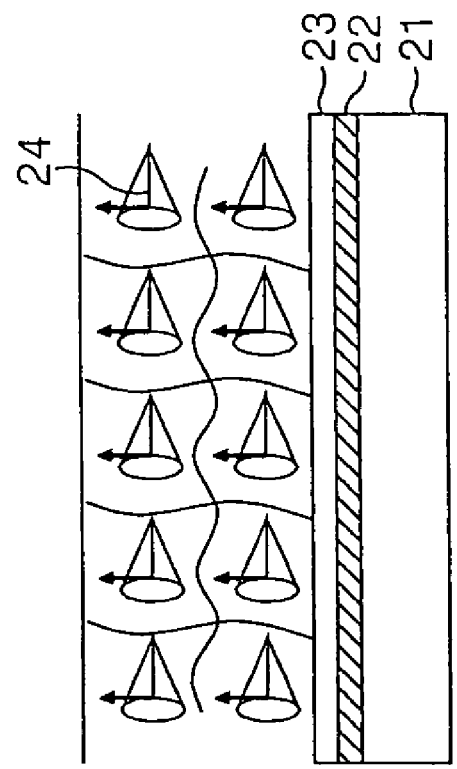

As shown in FIG. 2C, a photo-polymerization of the photo-polymerizational monomers 25 and 35 may be induced by illuminating ultraviolet ray (not shown) on the mixture. In particular, the photo-polymerizational monomers 25 and 35 may have a bridge bond generated by the photo-polymerization to form a polymer network. As a result, the ferroelectric liquid crystal molecules 24 and 34 have the spontaneous polarization direction sustained uniformly and their initial alignments stabilized.

In particular, a polymer stabilized FLC(PSFLC) alignment film may be formed on the substrates 21 and 31, thereby enabling the alignment state to be stabilized. Further, since a small amount of the photo-polymerizational monomers 25 and 35 is added, the extent of the bridge bond of the ferroelectric liquid crystal molecules 24 and 34 allows the ferroelectric liquid crystal molecules 24 and 34 to be rotated.

Figure 2D:
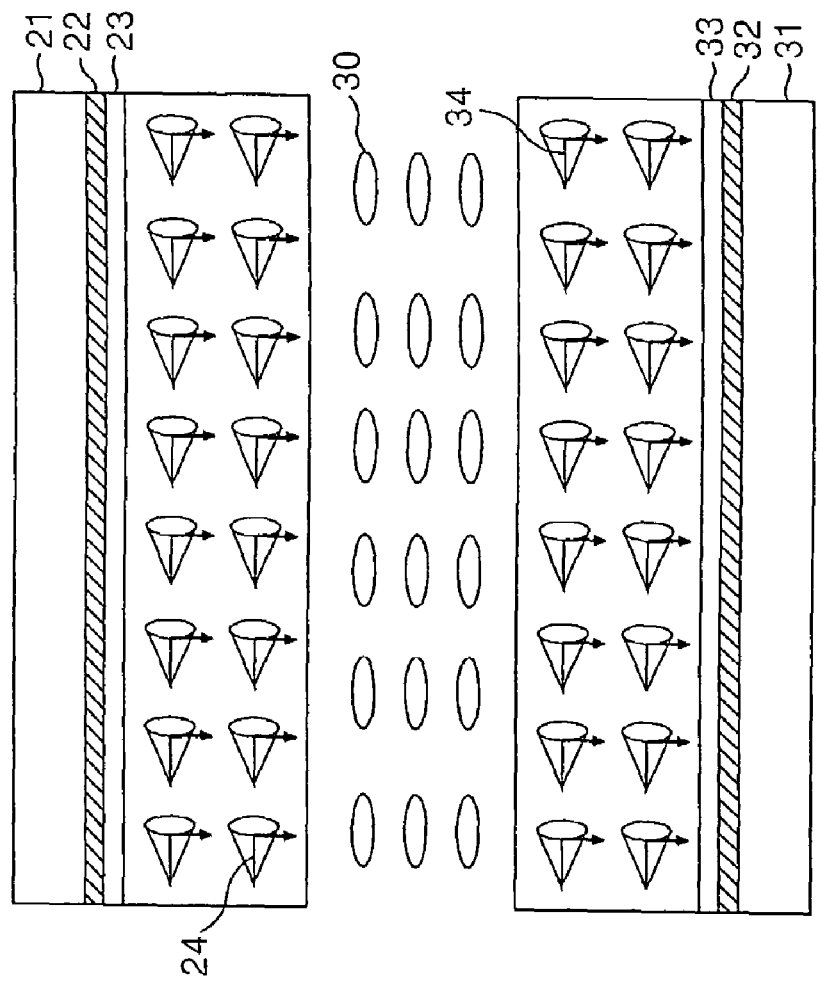

As shown in FIG. 2D, the upper and lower substrates 21 and 31 are bonded facing each other with a predetermined cell gap therebetween by a sealant (not shown) at a periphery of the substrates 21 and 31. Further, a nematic liquid crystal material 30 is formed at the cell gap between the upper and lower substrates 21 and 31. In particular, the ferroelectric liquid crystal layers containing the ferroelectric liquid crystal molecules 24 and 34 are not mixed with the nematic liquid crystal material 30. Thus, a phase separation is formed at an interface between the nematic liquid crystal material 30 and the ferroelectric liquid crystal layers. The nematic liquid crystal material 30 may be of a positive type or a negative type liquid crystal material.

FIG. 3 is a schematic perspective view illustrating the movement of a ferroelectric liquid crystal and a nematic liquid crystal in the liquid crystal display according to an embodiment of the present invention. As shown in FIG. 3, when a voltage difference is applied to the upper and lower electrodes 22 and 32 (shown in FIG. 2D), a nematic liquid crystal molecule 30 is driven in plane, thereby modulating light transmitted therethrough.

In addition, a ferroelectric liquid crystal molecule 34 rotates along a virtual cone, is driven in plane, and induces the in-plane-drive of the nematic liquid crystal molecule 30 adjacent thereto. In particular, when an electric field is applied to the ferroelectric liquid crystal molecule 34, the ferroelectric liquid crystal molecule 34 has a permanent polarization, i.e., spontaneous polarization. Thus, the interaction of the electric field and the spontaneous polarization like an interaction of magnets causes the ferroelectric liquid crystal molecule 34 to rapidly rotate.

As a result, the liquid crystal display device minimizes the deterioration of an aperture ratio by applying the electric field using the vertical electric field method, and realizes a wide viewing angle by the in-plane-driving of the nematic liquid crystal molecule 30. Further, the ferroelectric liquid crystal molecule 34 causes the nematic liquid crystal molecule 30 to rotate rapidly. Thus, the response speed of the nematic liquid crystal molecule 30 is improved.

As described above, the liquid crystal display device of the in-plane switching mode and the fabricating method thereof according to an embodiment of the present invention forms a ferroelectric liquid crystal layer on an alignment film in each of the upper and lower substrates and forms a nematic liquid crystal layer between the ferroelectric liquid crystal layers. The liquid crystal display device applies an electric field to the ferroelectric liquid crystal layers and the nematic liquid crystal layer using the vertical electric field method. As a result, the liquid crystal display device of the in-plane switching mode and the fabricating method thereof according to an embodiment of the present invention drives the liquid crystal molecules of the nematic liquid crystal layer in plane by an induction of the ferroelectric liquid crystal layers. Thus, an aperture ratio is increased and a wide viewing angle is achieved.

Further, the liquid crystal display device of the in-plane switching mode and the fabricating method thereof according to an embodiment of the present invention include inducing a photo-polymerization in the ferroelectric liquid crystal layers. Thus, the ferroelectric liquid crystal layers have the spontaneous polarization direction sustained uniformly and their initial alignments stabilized.

It will be apparent to those skilled in the art that various modifications and variations can be made in the in-plane-switching mode liquid crystal display device and the method of fabricating the same of the present invention without departing from the sprit or scope of the invention. Thus, it is intended that the present invention covers the modifications and variations of this invention provided they come within the scope of the appended claims and their equivalents.

What is claimed is:

1. An in-plane-switching mode liquid crystal display device, comprising:
    a first ferroelectric liquid crystal layer including first ferroelectric liquid crystal molecules on a first substrate;
    a second ferroelectric liquid crystal layer including second ferroelectric liquid crystal molecules on a second substrate, the first and second substrates being bonded to each other with a space therebetween; and
    a nematic liquid crystal layer including nematic liquid crystal molecules at the space between the first and second ferroelectric liquid crystal layers, the first and second ferroelectric liquid crystal layers including a photo-polymerizational monomer,
    wherein the nematic liquid crystal layer is substantially driven in plane by the first and second ferroelectric liquid crystal layers,
    wherein the molecules of the first and second ferroelectric liquid crystal layers rotate along a virtual cone, are driven in plane, and induce the in-plane-drive of the nematic liquid crystal molecules.

2. The device according to claim 1, wherein the photo-polymerizational monomer is about 1 wt %-5 wt % in each of the first and second ferroelectric liquid crystal layers, and wherein the photo-polymerizational monomer is a nematic photo-polymerizational monomer.

3. The device according to claim 1, further comprising
    a first electrode on the first substrate; and
    a second electrode on the second substrate, the first and second electrodes generating an electric field perpendicularly across the first and second ferroelectric liquid crystal layers and the nematic liquid crystal layer.

4. The device according to claim 3, wherein the first and second electrodes are transparent electrodes.

5. The device according to claim 3 further comprising:
    a first alignment film between the first electrode and the first ferroelectric liquid crystal layer; and
    a second alignment film between the second electrode and the second ferroelectric liquid crystal layer.

6. The device according to claim 1, wherein liquid crystal molecules of the first and second ferroelectric liquid crystal layers are cross-link-bonded.

7. The device according to claim 1, wherein the first and second ferroelectric liquid crystal layers include a phase transition from an isotropic phase to a chiral smectic C* phase.

8. The device according to claim 7, wherein the phase transition includes a chiral smectic A phase between the isotropic phase and the chiral smectic C* phase.

9. The device according to claim 7, wherein the phase transition includes a chiral nematic N* phase between the isotropic phase and the chiral smectic C* phase.

10. The device according to claim 1, wherein the first and second ferroelectric liquid crystal molecules are aligned along the spontaneous polarization direction from the first substrate to the second substrate.

11. The method according to claim 1, wherein the first and second ferroelectric liquid crystal molecules are aligned along the spontaneous polarization direction from the first substrate to the second substrate.

12. A method of fabricating an in-plane-switching mode liquid crystal display device, comprising:
    forming a first ferroelectric liquid crystal layer including first ferroelectric liquid crystal molecules on a first substrate;
    forming a second ferroelectric liquid crystal layer including second ferroelectric liquid crystal molecules on a second substrate, the first and second ferroelectric liquid crystal layers including a photo-polymerizational monomer;
    attaching the first and second substrates to each other with a space therebetween; and
    forming a nematic liquid crystal layer including nematic liquid crystal molecules at the space between the first and second ferroelectric liquid crystal layers,
    wherein the nematic liquid crystal layer is substantially driven in plane by the first and second ferroelectric liquid crystal layers,
    wherein the molecules of the first and second ferroelectric liquid crystal layers rotate along a virtual cone, are driven in plane, and induce the in-plane-drive of the nematic liquid crystal molecules.

13. The method according to claim 12, wherein forming the first and second ferroelectric liquid crystal layers include:
mixing the photo-polymerization monomer with a ferroelectric liquid crystal material, the photo-polymerization monomer being of about 1 wt %-5 wt % and the ferroelectric liquid crystal material being of about 95 wt %-99 wt %, and
wherein the photo-polymerizational monomer is a nematic photo-polymerizational monomer.

14. The method according to claim 13, wherein forming the first and second ferroelectric liquid crystal layers include exposing the mixture to light to induce a photo-polymerization of the mixture.

15. The method according to claim 12, wherein forming the first and second ferroelectric liquid crystal layers include aligning a spontaneous polarization direction of the first and second ferroelectric liquid crystal layers.

16. The method according to claim 15, wherein the aligning the spontaneous polarization direction of the first and second ferroelectric liquid crystal layers include exposing the first and second ferroelectric liquid crystal layers to one of an amphiphilic medium and an amphiphobic medium.

17. The method according to claim 15, wherein the aligning the spontaneous polarization direction of the first and second ferroelectric liquid crystal layers include applying an electric field or a magnetic field.

18. The method according to claim 12, wherein forming the first and second ferroelectric liquid crystal layers include a temperature treatment to induce a phase transition of the first and second ferroelectric liquid crystal layers.

19. The method according to claim 12, further comprising forming a first electrode on the first substrate; and
forming a second electrode on the second substrate, the first and second electrodes generating an electric field perpendicularly across the first and second ferroelectric liquid crystal layers and the nematic liquid crystal layer.

20. The method according to claim 19, wherein the first and second electrodes are formed of a transparent conductive material.

21. The method according to claim 19, further comprising:
a first alignment film between the first electrode and the first ferroelectric liquid crystal layer; and
a second alignment film between the second electrode and the second ferroelectric liquid crystal layer.

* * * * *